United States Patent
Fan et al.

(10) Patent No.: US 11,164,008 B2
(45) Date of Patent: Nov. 2, 2021

(54) METHOD AND CONTROLLER FOR CONTROLLING A VIDEO PROCESSING UNIT TO FACILITATE DETECTION OF NEWCOMERS IN A FIRST ENVIRONMENT

(71) Applicant: Axis AB, Lund (SE)

(72) Inventors: Xing Danielsson Fan, Lund (SE); Niclas Danielsson, Lund (SE); Anton Jakobsson, Lund (SE); Emanuel Johansson, Lund (SE); Thomas Winzell, Lund (SE); Jesper Bengtsson, Lund (SE)

(73) Assignee: Axis AB, Lund (SE)

( * ) Notice: Subject to any disclaimer, the term of this patent is extended or adjusted under 35 U.S.C. 154(b) by 278 days.

(21) Appl. No.: 16/166,955

(22) Filed: Oct. 22, 2018

(65) Prior Publication Data

US 2019/0130197 A1    May 2, 2019

(30) Foreign Application Priority Data

Oct. 27, 2017  (EP) .................................... 17198810

(51) Int. Cl.
*G06K 9/00*        (2006.01)
*G08B 13/196*      (2006.01)
(Continued)

(52) U.S. Cl.
CPC ..... *G06K 9/00778* (2013.01); *G06K 9/00718* (2013.01); *G08B 13/196* (2013.01);
(Continued)

(58) Field of Classification Search
None
See application file for complete search history.

(56) References Cited

U.S. PATENT DOCUMENTS 6,996,256 B2    2/2006   Pavlidis
7,787,663 B2    8/2010   Hartlove
(Continued)

FOREIGN PATENT DOCUMENTS

EP      3029600 A1    6/2016
WO      02/13535 A2   2/2002
(Continued)

OTHER PUBLICATIONS

Extended European search report dated May 9, 2018 for the European Patent Application No. 17198810.8.

*Primary Examiner* — Stuart D Bennett
(74) *Attorney, Agent, or Firm* — Volpe Koenig

(57) ABSTRACT

A method and a controller for controlling a video processing unit to facilitate detection of newcomers in a first environment. The method comprises: capturing a thermal image of a human object in the first environment, the first environment being associated with a first climate; calculating, based on the thermal image, a thermal signature of a portion of the human object; determining that the human object has entered the first environment from a second environment when the thermal signature of the portion of the human object deviates from a predetermined thermal signature associated with the first environment, wherein the second environment is associated with a second, different, climate; and controlling the video processing unit to prioritize the human object over other human objects when processing video frames depicting the human object together with the other human objects.

15 Claims, 3 Drawing Sheets

610

(51) Int. Cl.
  *H04N 7/18* (2006.01)
  *H04N 5/33* (2006.01)
  *H04N 19/167* (2014.01)
  *G07C 9/00* (2020.01)

(52) U.S. Cl.
  CPC .............. *H04N 5/33* (2013.01); *H04N 7/181* (2013.01); *H04N 7/183* (2013.01); *H04N 19/167* (2014.11); *G07C 9/00* (2013.01)

(56) References Cited

U.S. PATENT DOCUMENTS

| | | |
|---|---|---|
| 2007/0279215 A1 | 12/2007 | Tomooka et al. |
| 2008/0198159 A1 | 8/2008 | Liu et al. |
| 2008/0211916 A1 | 9/2008 | Ono |
| 2009/0096871 A1* | 4/2009 | Kuwano ................ G06T 7/20 348/169 |
| 2010/0141762 A1* | 6/2010 | Siann ............... H04N 5/232411 348/143 |
| 2015/0358557 A1 | 12/2015 | Terre et al. |
| 2016/0100764 A1 | 4/2016 | Teich |
| 2016/0117837 A1 | 4/2016 | Baltsen et al. |
| 2017/0053167 A1* | 2/2017 | Ren ........................... G06T 3/40 |
| 2017/0147885 A1* | 5/2017 | Aggarwal ............ G08B 13/194 |
| 2018/0143321 A1* | 5/2018 | Skowronek ............. G01S 17/42 |

FOREIGN PATENT DOCUMENTS

| | | |
|---|---|---|
| WO | 2013/052383 A1 | 4/2013 |
| WO | 2017/057274 A1 | 4/2017 |

* cited by examiner

METHOD AND CONTROLLER FOR CONTROLLING A VIDEO PROCESSING UNIT TO FACILITATE DETECTION OF NEWCOMERS IN A FIRST ENVIRONMENT

FIELD OF INVENTION

The present teachings relate to the field of video processing. In particular, it relates to control of a video processing unit to facilitate detection of newcomers in a first environment.

BACKGROUND

Video cameras are commonly used for surveillance purposes. For example, video cameras may be used inside a building to monitor the people therein. Some people may have permission to be in the building, for example, people who work in the building, whereas other people may not have permission to be in the building, and may thus be considered as intruders. In such surveillance applications, it is therefore of interest to distinguish intruders from the people who are allowed to be in the building.

Distinguishing newcomers from people who have been in a building for a while may also be interesting in other surveillance applications. For example, people who are in the building may be associated with metadata which characterizes the persons. As new people enters, it if of interest to associate the newcomers with such metadata as soon as possible.

One way of distinguishing out newcomers or intruders is to use video analytics tools which identify people in the recorded video and match the identities to a record of identities of people who already are in the building or who have permission to be in the building. However, when there are many people in the building, this may be computationally infeasible in view of the usually limited available computational power, in particular when the identification is carried out in real time. Another limiting factor is the bitrate of the video. Without further knowledge about the people in the building, all people depicted in the video, regardless of being newcomer or not, will typically be encoded with the same compression level. However, for improving the following analysis of the video, it may be of interest to spend more bits on the intruders than on the other people in the video. There is thus room for improvements.

SUMMARY

It is an object of the present teachings to mitigate the drawbacks mentioned above and, facilitate detection of newcomers in an environment.

According to a first aspect of the present teachings, the above object is achieved by a method of controlling a video processing unit to facilitate detection of newcomers in a first environment, comprising: capturing, a thermal image of a human object in the first environment, the first environment being associated with a first climate; calculating based on the thermal image, a thermal signature of a portion of the human object; determining that the human object has entered the first environment from a second environment when the thermal signature of the portion of the human object deviates from a predetermined thermal signature associated with the first environment, wherein the second environment is associated with a second, different, climate, and controlling the video processing unit to prioritize the human object over other human objects when processing video frames depicting the human object together with the other human objects.

The present teachings are based on the realization that a person who recently has entered a first environment, such as a temperature regulated building, from a second environment with another climate, such as from outdoors, will typically have a deviating thermal signature compared to a person who has stayed in the first environment for a while. Thus, by analysing the thermal signature of a person, or a portion of a person, one may distinguish a person who has recently entered the first environment, in other words, a newcomer, from a person who has been in the first environment for a while. Since persons who recently have entered may be of higher interest to analyse, for instance as they are more likely to be intruders, priority may be given to such persons over other persons when processing video frames. For example, higher priority may be given persons who have recently entered for the purpose of identification and/or encoding. In this way, computational efforts are primarily focused on suspected newcomers.

A newcomer is generally a person who recently, in other words, within a certain period of time, has entered the first environment. For intrusion detection applications, a newcomer may be considered as a suspected intruder.

The first environment and the second environment are typically two distinct, but neighbouring, environments. The first environment and the second environment may be separated from each other so as to allow the first and the second environment to have different climates. For example, the first environment could be a building and the second environment could be the outdoor environment outside of the building. According to another example, both the first and the second environment could be indoor environments having different temperatures, such as one air-conditioned environment and one environment having a non-regulated temperature.

The first and the second environment are associated with different climates. Thus, the first and the second environment define different climate zones. The climate zones may, for example, differ by temperature and humidity.

By a portion of a human object is generally meant a portion of a human body. A portion of the human object may include the whole body, or a limited portion thereof, such as the face.

By one thermal signature deviating from another thermal signature is generally meant that the thermal signatures deviate by more than a predefined threshold. Depending on how the thermal signature is measured (as further discussed below), the deviation between two thermal signatures may be calculated in different ways, for example by applying a norm such as an L2 norm. The predefined threshold may also vary spatially such that larger deviations are acceptable for some spatial regions of the thermal signature than for other spatial regions of the thermal signature. The predefined threshold may be selected based on a variability measure of the predefined thermal signature associated with the first environment, in other words, based on the variability of thermal signatures of human object objects which have been in the first environment for a while.

The video processing unit may be arranged to carry out different types of processing with respect to the human object who is determined to have entered the first environment from the second environment and given higher priority. For example, the video processing unit may be controlled to prioritize the human object when performing video content analytics, in other words, when analyzing the image contents of the video, or when encoding video frames depicting the human object.

Video content analytics may, for instance, include identification of the human object, and/or other types of analytics related to the human object, such as identifying items carried by the human object or analyzing a motion pattern of the human object. By giving higher priority to the human object who is determined to have entered the first environment from the second environment when performing video content analytics, more computational resources may be spent on identification or analysis of the suspected newcomer than on other persons in the first environment.

By giving higher priority to the human object who is determined to have entered the first environment from the second environment when performing encoding, more bits may be spent on encoding the suspected newcomer than on other persons in the first environment. The suspected newcomer may in this way be depicted with higher image quality in the resulting decoded video, thereby facilitating detection and identification of the newcomer.

The human object may be associated with a priority level, and the video processing unit may be controlled to prioritize the human object by increasing its priority level in relation to priority levels of the other human objects. Thus, each depicted object may have a priority level, and the priority level of a human object who is determined to have entered the first environment may be increased in relation to the priority levels of the human objects which have been the first environment for a while.

For example, the video processing unit may be controlled to analyze human objects in video frames in decreasing order of priority level. In this way, human objects having a higher priority level, in other words, the suspected newcomers are analyzed first, and human objects having a lower priority level, in other words, human objects who have been in the first environment for a while and are not suspected to be newcomers, will be analyzed thereafter. In some cases, there may not be enough computational resources to analyze all human objects. By analyzing the human objects in order of priority, one can make sure that the available resources are primarily spent analyzing the suspected newcomers. The analysis may, for instance, include identification of the human object, analyzing a behavior, such as a motion pattern of the human object, and/or analyzing objects carried by the human object.

The video processing unit may be controlled to reduce the priority level of the human object after it has been analyzed. The above method is typically repeated on a regular time basis as new video frames are captured. Thus, a human object may be determined to be a suspected newcomer based on a deviating thermal signature several times as the method is repeated. However, it may typically be sufficient to analyze such a human object once with high priority, and, once analyzed, the human object may be treated with lower priority similar to that of the other human objects in the first environment. For example, if the suspected newcomer based on the high priority analysis turns out to be a person who has permission to be in the building, further analysis of that human object need not be given higher priority. According to another example, if the suspected newcomer has not behaved in a suspicious manner for a predetermined amount of time, the priority of the human object may be lowered again.

According to a further example, the video processing unit may be controlled to select complexity of an algorithm used to analyze a human object or a number of algorithms used to analyze a human object based on the priority level of the human object, such that the complexity or the number of algorithms increase with the priority level of the human object. For example, a more complex identification algorithm may be selected when identifying a suspected newcomer. The more complex identification algorithm may give a more reliable result, but will typically also be more computationally demanding. It may also be the case that several algorithms are run on a suspected newcomer. For example, for suspected newcomers an identification of the human object, an analysis of the motion pattern of the human object, and a check of items carried by the human object may be carried out, whereas for human objects of lower priority only an identification is carried out.

The video processing unit may be controlled to prioritize the human object by reducing a compression level in a region corresponding to the human object compared to regions corresponding to the other human objects when encoding video frames depicting the human object together with the other human objects. In other words, more bits may be used on encoding the suspected newcomer compared to the other human objects. In this way, the suspected newcomer will come across with higher image quality at the expense of the other human objects, thereby further facilitating newcomers to be detected. The compression level may for example correspond to a quantization parameter such as that of the H.264 standard.

The human object may be associated with a threshold for triggering an alarm, and the video processing unit may be controlled to reduce the threshold for triggering an alarm in relation to corresponding thresholds of the other human objects. In this way, it becomes more likely that alarms are triggered for suspected newcomers than for other human objects. The thresholds may, for example, be related to confidence levels. By reducing confidence levels, also less deviating observations (i.e., more likely observation) may trigger an alarm for suspected individuals. For example, the sensitivity to detect certain items (such as weapons, bombs and the like) carried by the human object could be made higher for suspected individuals.

As described above, the method is typically repeated on a regular time basis as new video frames are received. For some frames, human objects will be determined to have entered the first environment from the second environment, whereas for other frames there will be no such human objects.

The method may further comprise controlling the video processing unit to increase a frame rate when processing video frames if a human object which is determined to have entered the first environment (102) from the second environment (104) is depicted in the video frames, and to reduce a frame rate when processing video frames if no human object which has entered the first environment from the second environment is currently depicted in the video frames. In this way, bit rate may be saved until suspected newcomers are present in the video frames.

Generally, the thermal signature of the portion of the human object reflects a distribution of intensity values of the thermal image in a region corresponding to the portion of the human object. The distribution of intensity values may in some cases correspond to a histogram of the intensity values. In some cases, the thermal signature reflects a spatial distribution, that is, a spatial pattern of intensity values of the thermal image in a region corresponding to the portion of the human object. The thermal signature may also be thought of as an optical signature, which is a term commonly used in the military community, but limited to the thermal infrared portion of the spectrum including mid wave infrared and long wave infrared.

The predetermined thermal signature associated with the first environment corresponds to a thermal signature of a human object being in thermal equilibrium with the first climate of the first environment. A human object will typically be in thermal equilibrium with the first climate of the first environment when it has been in the first environment for a certain time. During that certain time, the surface temperature of the human object has adapted to that of the first environment and the thermal signature of the human object remains essentially constant after that certain time. The thermal signature of a human object being in thermal equilibrium may correspond to an average thermal signature of a human object being in thermal equilibrium with the first climate of the first environment. There may further be several predetermined thermal signatures of a human object being in thermal equilibrium with the first climate of the first environment. For example, there may be different predetermined thermal signatures corresponding to different poses of the human object.

Generally, as used herein a thermal signature associated with an environment refers to a thermal signature of a human object being in thermal equilibrium with the climate of that environment.

The steps of calculating and determining may be carried out in different manners. In its simplest form, this may include comparing a histogram of the intensity values of the thermal image in a region corresponding to the portion of the human object to a predetermined histogram corresponding to a human object which has been in the first environment for a certain time. If the histograms differ by more than a threshold value, it is determined that the human object has entered the first environment from the second environment, and the human object is prioritized as explained above. In a more sophisticated approach, also the spatial distribution of the intensity values in the thermal image in a region corresponding to the portion of the human object is taken into account. This may, for example, be implemented by using a machine learning algorithm, such as a convolutional neural network. In more detail, the thermal signature may be calculated as a region of the thermal image that corresponds to the portion of the human object, and wherein the step of determining comprises: providing the region of the thermal image that corresponds to the portion of the human object to a machine learning algorithm, wherein the machine learning algorithm has been trained to distinguish between thermal images of human objects which are present in the first environment but which are not in thermal equilibrium with the first climate of the first environment, and thermal images of human objects which are present in the first environment and which are in thermal equilibrium with the first climate of the first environment. The human objects which are present in the first environment but which are not in thermal equilibrium with the first climate may be human objects who were in thermal equilibrium with the second climate and then entered the first environment from the second environment. Those human objects may have stayed in the first environment for less than a certain period of time. The certain period of time may be of a duration which is short enough to ensure that the human objects are not yet in thermal equilibrium with the first climate. In contrast, the human objects which are present in the first environment and which are in thermal equilibrium with the first climate may be human objects who have stayed in the first environment for more than the certain period of time, thereby ensuring that the human objects are in thermal equilibrium with the first climate. Once the machine learning algorithm has been trained, which is typically a process carried out prior to applying the method, the machine learning algorithm may fast and efficiently be used to check whether the thermal signature of the portion of the human object deviates from a predetermined thermal signature associated with the first environment.

As explained above, the decision on whether or not the human object has entered the first environment from the second environment is based on the thermal image. However, the result of the determination may be used by both the thermal camera or in a visual camera depicting the same scene. The video processing is thus not limited to processing of thermal images. In more detail, the thermal image may be captured by a thermal camera, and the video processing unit may be controlled to prioritize the human object when processing video frames captured by the thermal camera or when processing video frames captured by a visual light camera depicting the same human object.

The method may further activate or control other types of sensors than image sensors, such as audio sensors and vibration sensors, responsive to the determination that a human object has entered the first environment from the second environment. For instance, an audio detector may be activated to detect and analyze audio responsive to such determination. In that way, the audio detection and analysis may be limited to moments in time when a human object just entered the first environment from the second environment. Apart from such moments in time, the audio detector may be deactivated to respect privacy of the human objects.

According to a second aspect of the present teachings, the above object is achieved by a controller for controlling a video processing unit to facilitate detection of newcomers in a first environment, comprising: a receiver configured to receive a thermal image of a human object in the first environment, the first environment being associated with a first climate; a calculating component configured to calculate, based on the thermal image, a thermal signature of a portion of the human object; a determining component configured to determine that the human object has entered the first environment from a second environment when the thermal signature of the portion of the human object deviates from a predetermined thermal signature associated with the first environment, wherein the second environment is associated with a second, different, climate, and a control component configured to control the video processing unit to prioritize the human object over other human objects when processing video frames depicting the human object together with the other human objects.

According to a third aspect of the present teachings, the above object is achieved by a computer program product comprising a non-transitory computer-readable storage medium having computer code instructions stored thereon or a non-transitory computer-readable storage medium having instructions stored thereon which, when executed, cause the device to execute the method of the first aspect when executed by a device having a processing capability.

The second and third aspects may generally have the same features and advantages as the first aspect. It is further noted that the present teachings relate to all possible combinations of features unless explicitly stated otherwise.

BRIEF DESCRIPTION OF THE DRAWINGS

A more detailed understanding may be had from the following description, given by way of example in conjunction with the accompanying drawings where.

DETAILED DESCRIPTION

The present teachings will now be described more fully hereinafter with reference to the accompanying drawings, in which embodiments of the present teachings are shown. The systems and devices disclosed herein will be described during operation.

Figure 1:
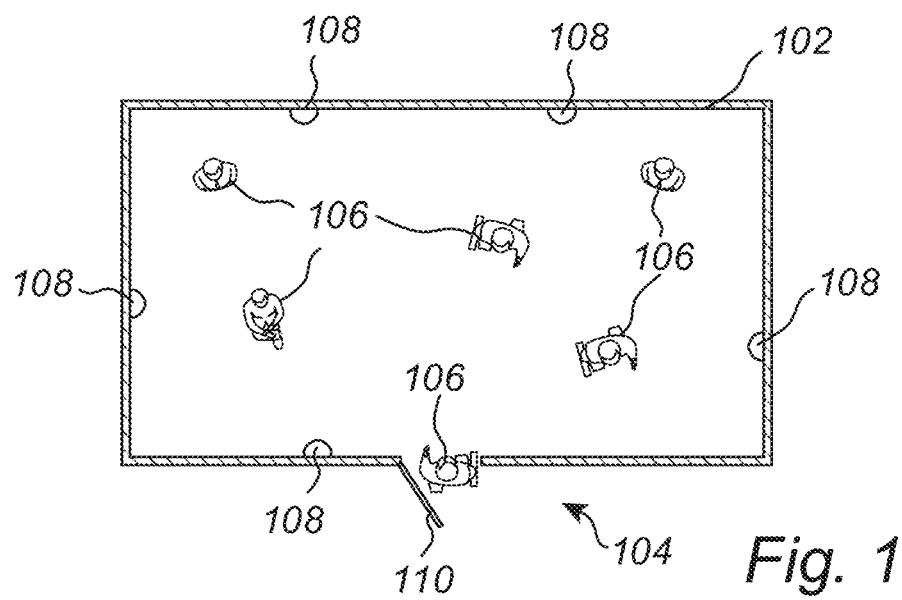
FIG. 1 schematically illustrates a first environment in which embodiments could be implemented.

FIG. 1 illustrates a first environment 102 and a second environment 104. The first environment 102 may for example be a building and the second environment 104 may be the outdoor surroundings of the building. The first environment 102 is associated with a first climate, such as an indoor climate of the building. The second environment 104 is associated with another climate, such as an outdoor climate. There is further an entrance 110 via which a human object 106 may enter the first environment 102 from the second environment 104. The entrance 110 may be a regular entrance or an entrance which is not supposed to be used as a regular entrance, such as an emergency exit or a window. As a human object enters the first environment 102 from the second environment 104, it will go from the climate of the second environment 104 to the climate of the first environment 102. At first, the newly entered human object will have a surface temperature whose distribution is adapted to the climate of the second environment 104. For example, the human object may have been in thermal equilibrium with the second environment 104 which will be reflected by the distribution of its surface temperature. However, as the human object 106 enters the first environment 102 the distribution of its surface temperature starts to adapt to the climate of the first environment 102 until the human object, after a while, is in thermal equilibrium with the first environment. Thus, after a human object 106 has entered into the first environment 102 from the second environment 104 there will be a time window during which the distribution of the surface temperature of the newly entered human object 106 differs from the distribution of the surface temperature of a human object 106 who has been in the first environment 102 long enough to be in thermal equilibrium with the first environment 102.

The first environment 102 is monitored by one or more camera systems 108. In particular, the one or more camera systems 108 are arranged to monitor human objects 106, in other words, persons, who are in the first environment 102. In particular, the camera systems 108 are arranged to distinguish newcomers from people who are allowed to be in the first environment 102. For example, a list of people who are allowed to be in the first environment 102 may be maintained and kept accessible to the one or more camera systems 108 for identification purposes. In order to facilitate the detection of newcomers in the first environment 102, the camera systems 108 make use of the fact that human objects 106 which recently have entered the first environment 102 from the second environment have a deviating temperature as further explained above. How this is done will be explained in more detail later on. Further, since intruders are more likely than other persons to enter via non-regular entrances, such as via emergency exits or windows, the one or more camera systems 108 may for intrusion detection purposes advantageously be arranged to monitor areas of the first environment 102 in the vicinity of non-regular entrances, such as emergency exits and windows.

Figure 2:
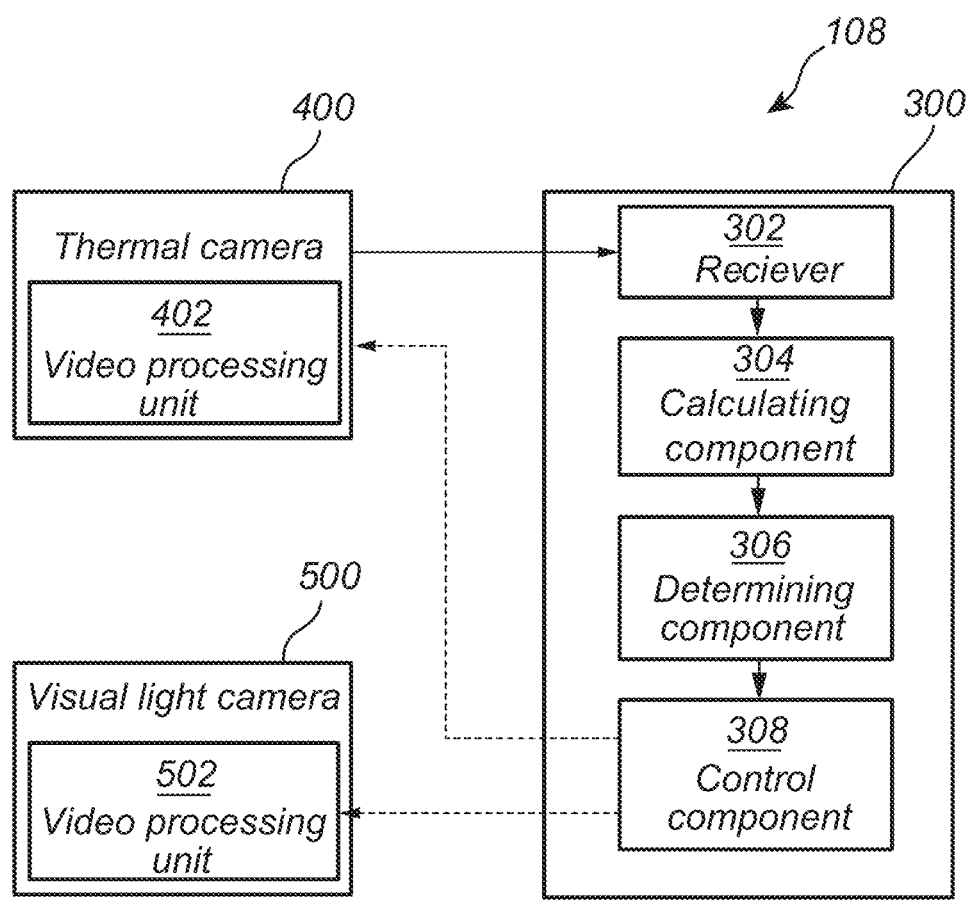
FIG. 2 illustrates a camera system comprising a controller according to embodiments.

FIG. 2 schematically illustrates a camera system 108. The camera system 108 comprises a controller 300 and a thermal camera 400. The camera system 108 may in some embodiments also comprise a visual light camera 500, in other words, a camera operating in the visual part of the spectrum. When in use, the visual light camera 500 may be arranged to depict the same scene as the thermal camera 400, meaning that the visual light camera 500 may be arranged to capture images which depict the same human objects 106 as the thermal camera 400.

The thermal camera 400 and the visual light camera 500 may each comprise a video processing unit 402, 502. The video processing unit 402, 502 may comprise a video encoding unit for encoding video captured by the thermal camera 400 or the visual light camera 500. The video processing unit 402, 502 may comprise a video analytics unit for analysing contents of video captured by the thermal camera 400 or the visual light camera 500. The controller 300 is configured to control the video processing unit 402, 502 of at least one of the thermal camera 400 and the visual light camera 500. For this purpose, the controller 300 comprises a receiver 302, a calculating component 304, a determining component 306, and a control component 308. Albeit the video processing unit 402, 502 is depicted as being included in one of the thermal camera 400 and the visual light camera 500, it is to be understood that the video processing unit 402, 502 may be located elsewhere in the system, such as in a server or a dedicated processing device which may communicate with one or more of the cameras 400, 500, for instance over a network.

The controller 300 thus comprises various components 302, 304, 306, 308 which are configured to implement the functionality of the controller 300. In particular, each illustrated component corresponds to a functionality of the controller 300. Generally, the controller 300 may comprise circuitry which is configured to implement the components 302, 304, 306, 308 and, more specifically, their functionality.

In a hardware implementation, each of the components 302, 304, 306, 308 may correspond to circuitry which is dedicated and specifically designed to provide the functionality of the component. The circuitry may be in the form of one or more integrated circuits, such as one or more application specific integrated circuits. By way of example, the control component 308 may thus comprise circuitry which, when in use, controls the video processing unit 402, 502.

In a software implementation, the circuitry may instead be in the form of a processor, such as a microprocessor, which in association with computer code instructions stored on a (non-transitory) computer-readable medium, such as a non-volatile memory, causes the controller 300 to carry out any method disclosed herein. In that case, the components 302, 304, 306, 308 may thus each correspond to a portion of computer code instructions stored on the computer-readable medium, that, when executed by the processor, causes the controller 300 to carry out the functionality of the component.

It is to be understood that it is also possible to have a combination of a hardware and a software implementation, meaning that the functionality of some of the components 302, 304, 306, 308 are implemented in hardware and others in software.

Figure 3A:
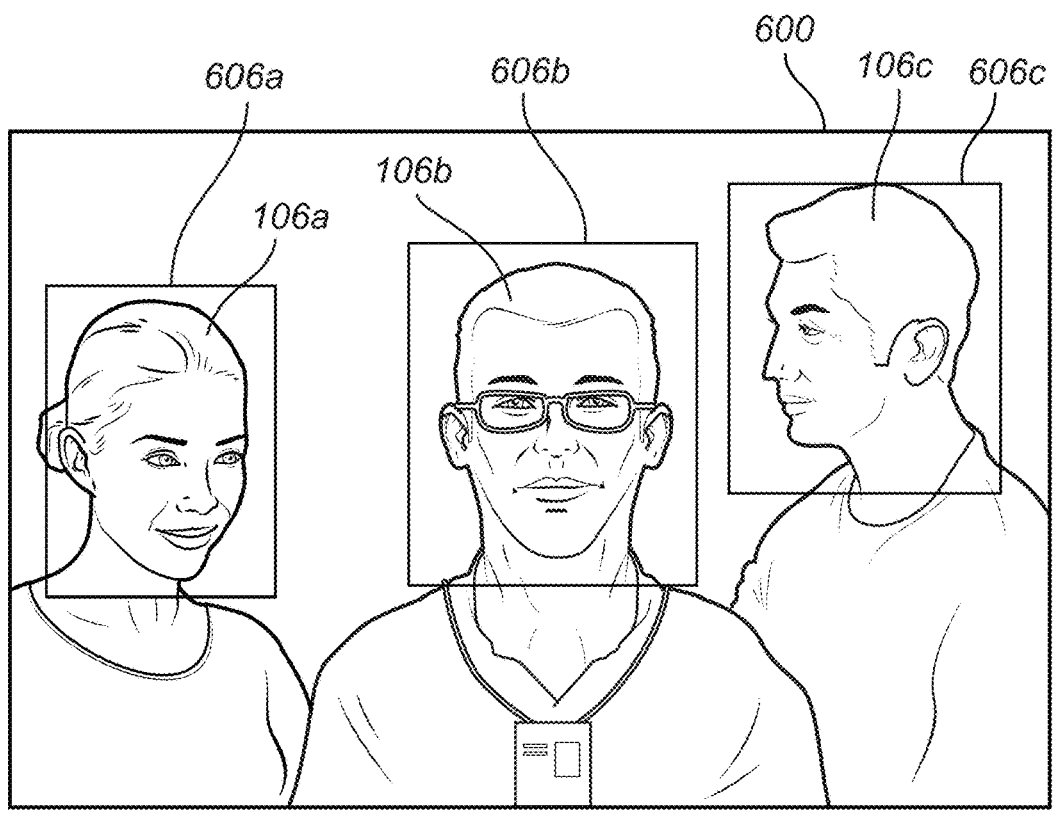
FIG. 3a illustrates a thermal image depicting human objects in a first environment.
Figure 3B:
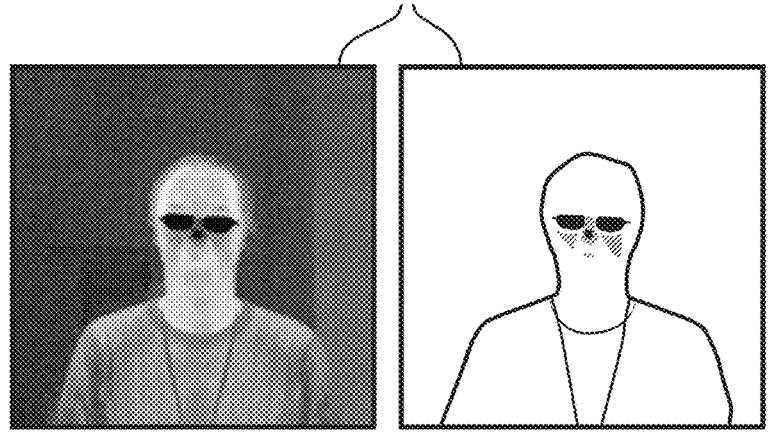
FIG. 3b illustrates to the left a thermal signature of a human object depicted in the thermal image of FIG. 3a, and to the right a simplified version of the thermal signature highlighting certain aspects of the thermal signature.
Figure 3C:
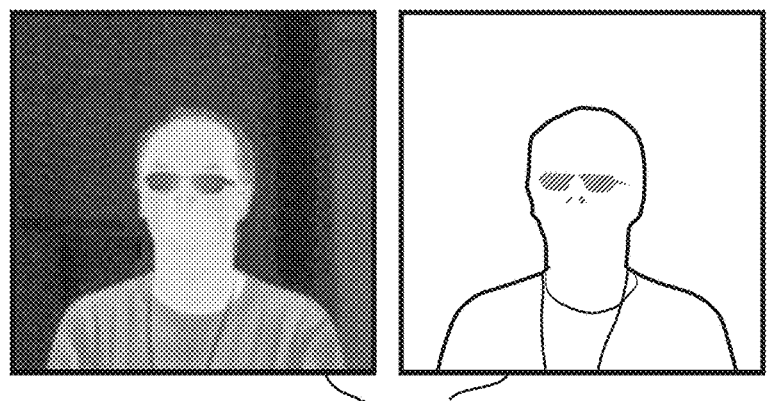
FIG. 3c illustrates to the left a predetermined thermal signature associated with a first environment, and to the right a simplified version of the predetermined thermal signature highlighting certain aspects of the predetermined thermal signature.
Figure 4:
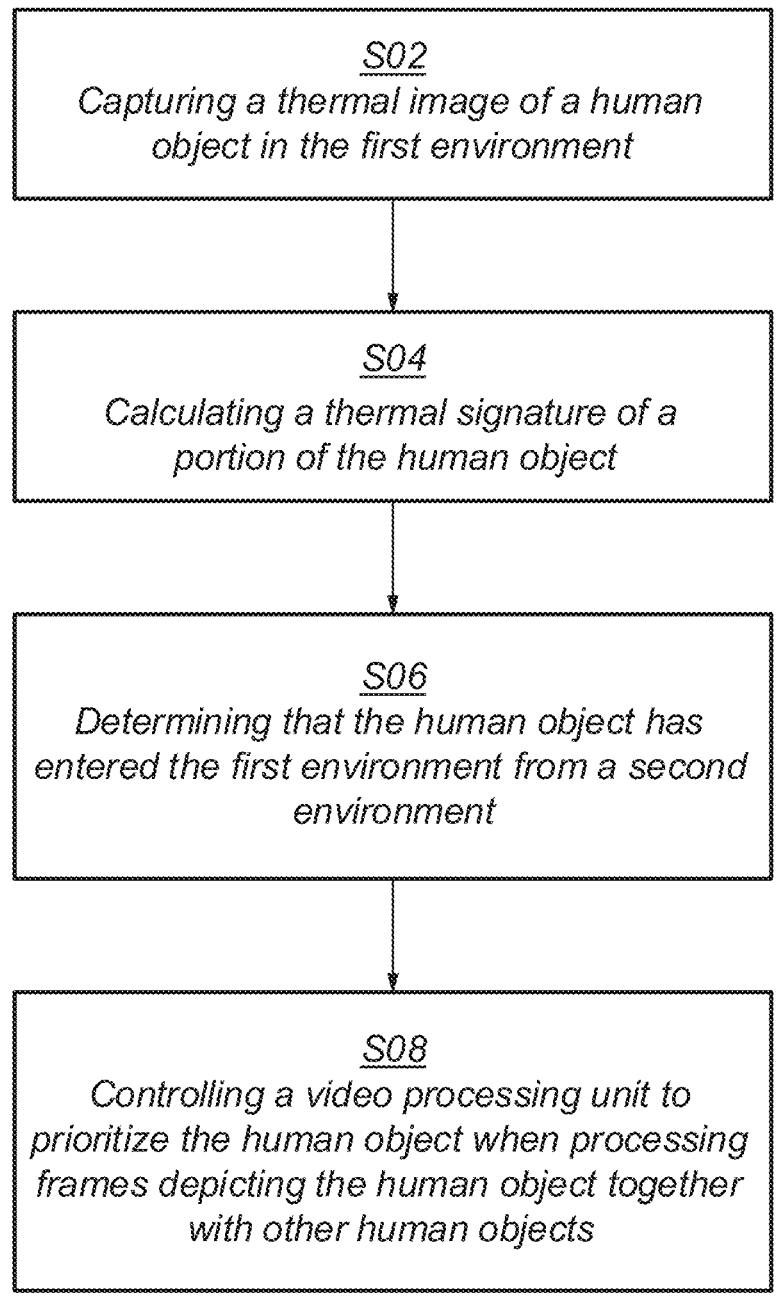
FIG. 4 is a flow chart of a method of controlling a video processing unit to facilitate detection of newcomers in a first environment according to embodiments.

The operation of the controller 108 will now be described in more detail with reference to FIGS. 1, 2, 3a-c and the flow chart of FIG. 4.

In step S02, the thermal camera 400 captures a thermal image of one or more human objects 106 in the first environment 102. The thermal image is received by receiver 302 of the controller 300. FIG. 3a is a schematic illustration of a thermal image 600 which depicts three human objects 106a, 106b, 106c. The thermal camera 400 may be calibrated, meaning that the intensity values in the thermal image are calibrated with respect to temperature, or uncalibrated, meaning that the intensity values in the thermal image are not calibrated with respect to temperature. In the former case, temperatures may be read out directly from the intensity values in the thermal image, whereas in the latter case temperatures may not be read out directly from the intensity values of the thermal image. Still, for an uncalibrated camera, relative levels of temperature may be read out from the intensity values in the thermal image.

In step S04, the calculating component 304 proceeds to calculate, based on the thermal image 600, a thermal signature of a portion 606a, 606b, 606c of the depicted one or more objects 106a, 106b, 106c. The portion 606a, 606b, 606c may for instance correspond to the face of the one or more objects 106a, 106b, 106c. More specifically, the calculating component 304 may first find the concerned portion 606a, 606b, 606c of each depicted human object 106a, 106b, 106c for instance by using standard image processing tools, such as standard face detection algorithms. According to embodiments, an image captured by the visual light camera 500 depicting the same area as the thermal image 600 may be used to facilitate the detection of the concerned portion 606a, 606b, 606c in the thermal image 600. For instance, relevant portions may first be detected in the image from the visual light camera 500, for instance by using a standard image processing tool, and then the corresponding portions in the thermal image 600 captured by the thermal camera 400 may be identified as the portions 606a, 606b, 606c.

Next, the calculating component 304 may form a thermal signature of the found portion 606a, 606b, 606c for each depicted human object 106a, 106b, 106c based on the intensity values of the thermal image 600 in the found portions 606a, 606b, 606c.

Generally, the thermal signature of a human object 106a, 106b, 106c reflects a distribution of intensity values of the thermal image 600 in a region corresponding to the portion 606a, 606b, 606c of the human object 106a, 106b, 106c. As further described above, the thermal signature may in its simplest form correspond to a histogram of the intensity values of the thermal image 600 in the region corresponding to the portion 606a, 606b, 606c of the human object 106a, 106b, 106c. Further, in case of a calibrated thermal camera where the intensity values of the thermal image directly correspond to temperature values, the thermal signature may be based on the temperature values themselves, such as the temperature difference within the region of the thermal image corresponding to the portion of the human object 106. Alternatively, in order to also take the spatial variation into account, the thermal signature may correspond to the region of the thermal image corresponding to the portion 606a, 606b, 606c of the human object 106a, 106b, 106c, in other words, the thermal signature in that case corresponds to a portion of the thermal image. In case of a calibrated thermal camera, the thermal signature then corresponds to the spatial distribution of the temperature values within the region of the thermal image corresponding to the portion 606a, 606b, 606c of the human object 106a, 106b, 106c. A thermal signature which takes the spatial variation into account is illustrated in FIG. 3b which shows a thermal signature 608b corresponding to the human object 106a. To the left in FIG. 3b, the thermal signature 608b as it may look like in reality is shown, that is, as a thermal image. For the sake of illustration, a simplified version of the thermal signature 608b is shown to the right of FIG. 3b. The illustrated thermal signature 608b clearly shows that the nose and the glasses are colder than the rest of the face. This is highlighted in the simplified version to the right in FIG. 3b.

In step S06, the determining component 306 proceeds to determine whether or not each human object 106a, 106b, 106c depicted in the thermal image 600 has entered the first environment 102 from the second environment 104. For that purpose, the determining component 306 may compare the thermal signature 608b of each human object 106a, 106b, 106c in the thermal image 600 to a predetermined thermal signature associated with the first environment 102. FIG. 3c shows an example of such a predetermined thermal signature 610 associated with the first environment 102. To the left in FIG. 3c, the predetermined thermal signature 610 as it may look like in reality is shown, that is, as a thermal image. For the sake of illustration, a simplified version of the predetermined thermal signature 610 is shown to the right of FIG. 3c. As can be seen in FIG. 3c, both in the left and the right image, the nose of the predetermined thermal signature 610 is not colder than the rest of the face. The predetermined thermal signature 610 associated with the first environment 102 typically corresponds to a thermal signature of a human object which has been in the first environment 102 long enough to be in thermal equilibrium with the climate of the first environment 102. The thermal signature 610 may be formed as an average thermal signature, that is, the thermal signature 610 may be formed as an average over thermal signatures associated with several persons. Further, there may be several predetermined thermal signatures 610 corresponding to different poses that he human objects 106 may have. For example, it may be suitable to use a predetermined thermal signature looking straight ahead with respect to the human object 106b, whereas it may be suitable to use a predetermined thermal signature in profile for the human object 106c.

Based on the comparison between the thermal signature 608b and the predetermined thermal signature 610, the determining component 306 may then check whether the thermal signature 608b of the portion 606b of the human object 106b deviates from the predetermined signature 610 associated with the first environment 102. If the thermal signature 608b deviates from the predetermined signature 610 it is determined that the human object 106b has entered the first environment 102 from the second environment 104.

The check of whether the thermal signature 608b of the portion 606b of the human object 106b deviates from the predetermined signature 610 associated with the first environment 102 may be performed in different ways depending on how the thermal signatures 608b and 610 are represented. For example, if the thermal signatures 608b and 610 are represented as histograms of intensity values, the variability of the intensity values in the thermal signatures 608b, 610, for example as measured as a standard deviation could be compared. If the variability differs by more than a threshold, it may be determined that the thermal signature 608b deviates from the predetermined signature 610. If a calibrated thermal camera is used to measure the surface temperatures, that is, to capture the thermal image 600, another approach may be taken. The predetermined thermal signature 610 may in that case correspond to a temperature interval. If a temperature value falling outside of the temperature interval is found in the portion 606b of the thermal image 600, that is, within the thermal signature 608b, it may be determined that the thermal signature 608b deviates from the predetermined thermal signature 610.

For the example illustrated in FIGS. 3a, 3b, 3c it is assumed that such a deviating thermal signature was only found for the human object 106b, whereas the human objects 606a, and 606c were not found to have a deviating thermal signature. Since those of the human objects 106a, 106b, 106c which are determined to have entered the first environment 102 from the second environment 104 may be considered as suspected newcomers, only the human object 606b will thus be considered as a suspected newcomer.

Step S06 may be implemented by a machine learning algorithm. As further described above in connection with step S04, the thermal signature 608b may correspond to a region of the thermal image 600 that corresponds to the portion 606b of the human object 106b. That region of the thermal image may in step S06 be provided as input to a machine learning algorithm. Such algorithms include, but are not limited to, convolutional neural networks. Prior to applying the method described herein, the machine learning algorithm needs to be trained so as to set the internal parameters of the machine learning algorithm.

The training data used to train the machine learning algorithm may comprise two different sets of thermal images. A first set may comprise thermal images of human objects which are present in the first environment 102 and are in thermal equilibrium with the climate of the first environment 102. The first set of training data may, for example, be generated by using the thermal camera 400 to capture images of human objects 106 which have been in the first environment 102 long enough to be in thermal equilibrium with the climate of the first environment 102. The second set of training data may be generated by using the thermal camera 400 to capture images of human objects 106 which are present in the first environment 102 but which are not in thermal equilibrium with the first climate of the first environment 102. For example, the second set of training data may be generated by using the thermal camera 400 to capture images of human objects 106 which have entered the first environment 102 from the second environment and which have not been in the first environment 102 long enough to be in thermal equilibrium with the first climate. On the contrary, the human objects may have been in the second environment 104 long enough to be in thermal equilibrium with the climate of the second environment 104 before entering into the first environment 102.

In an alternative embodiment, the first set may comprise thermal images of human objects which are in thermal equilibrium with the climate of the first environment 102. Also in this case, the first set of training data may, for example, be generated by using the thermal camera 400 to capture images of human objects 106 which have been in the first environment 102 long enough to be in thermal equilibrium with the climate of the first environment 102. The second set may comprise thermal images of human objects which are in thermal equilibrium with the climate of the second environment 104. The second set of training data may, for example, be generated by capturing thermal images of human objects which have been in the second environment 104 long enough to be in thermal equilibrium with the second environment 104.

These two sets of thermal images may then be used as known in the art to train the machine learning algorithm such that the machine learning algorithm learns to distinguish between the thermal images of the first set of training data and the second set of training data.

Once the machine learning algorithm has been trained it may be used to implement steps S04 and S06. In more detail, the regions of the thermal image corresponding to the portions 606a, 606b, 606c of the human objects 106a, 106b, 106c may each be input to the machine learning algorithm. The machine learning algorithm, as trained according to the above, will then output a decision on whether or not the human objects 106a, 106b, 106c have a thermal signature which deviates from, that is, is distinguished from a thermal signature of human objects which are in thermal equilibrium with the climate of the first environment 102.

It may happen that the outcome of step S06 is that none of the depicted human objects 106a, 106b, 106c is determined to have entered the first environment 102 from the second environment 104. In such cases, there is thus no suspected newcomer currently depicted in the thermal image 600. When that occurs, the control component 308 may control the video processing unit 402, 502 to reduce a frame rate of the video. In this way, both computational resources may be saved, since a reduced number of frames will be processed, as well as bitrate, since a reduced number of frames need to be encoded. Conversely, when the outcome of step S06 is that a human object 106b is determined to have entered the first environment 102 from the second environment 104, the frame rate may be increased so as to allow monitoring the suspected intruder at a higher temporal resolution.

In step S08, the control component 308 then proceeds to control the video processing unit 402, 502 of the thermal camera 400 and/or the visual light camera 500. More specifically, the control component 308 controls how the video processing unit 402, 502 prioritizes the different depicted human objects 106a, 106b, 106c when processing video frames. The processing carried out by the video processing unit 402, 502 may involve performing video content analytics, such as performing identification of the human objects, and/or video encoding. Generally, the control component 308 controls the video processing unit 402, 502 to prioritize human objects 106b which have been determined to have entered the first environment 102 from the second environment 104 over the other human objects 106a, 106c. Thus, if a human object 106b has been determined, in step S06, to have entered the first environment from a second environment it will be given higher priority than the other human objects 106a, 106c which were not found to recently have entered the first environment 102 from the second environment 104.

In order to control the priority of the different depicted human objects 106a, 106b, 106c, each depicted human object 106a, 106b, 106c may be associated with a priority level. When an object, such as object 106b in the example of FIGS. 3a, 3b, 3c, has been determined by the determining component 306 in step S06 to be a suspected newcomer, the control component 308 may control the video processing unit 402, 502 to increase the priority level of the suspected newcomer 106b in relation to the priority levels of the other human objects 106a, 106c which were not suspected to be newcomers.

Once the priority levels have been set, the control component 308 may control the video processing unit 402, 502 to analyse the human objects 106a, 106b, 106c in the video frames in decreasing order of priority level. In other words, the video processing unit 402, 502 may be controlled to first analyse the human object 106b having the highest priority level, and then, if there are enough computational resources left, the human objects 106a, 106c having lower priority levels. The analysis may, for example, involve identification of the human objects 106a, 106b, 106c, analysis of items carried by the human objects 106a, 106b, 106c, and analysis of motion patterns of the human objects 106a, 106b, 106c. When the analysis of the human object 106b having increased priority level has been completed, the control component 308 may control the video processing unit 402, 502 to reduce the priority level again. Thus, as new video frames arrives, the suspected newcomer 106b is not given a higher priority since it has already been analysed.

The priority level may not only be used to control the order in which the analysis in the video processing unit 402, 502 is carried out, but it may also be used to control which types of analysis to be carried out. More specifically, the video processing unit 402, 502 may be controlled to use more complex algorithms with respect to human objects 106b having a higher priority level than for human objects 106a, 106c having a lower priority level. Similarly, the video processing unit 402, 502 may be controlled such that an increased number of algorithms are carried out with respect to human objects 106b having a higher priority level than for human objects 106a, 106c having a lower priority level. For example, for a suspected newcomer 106b, more complex algorithms for identification, analysis of items carried by the human object, and/or analysis of motion pattern of the human object may be carried out. Also, for a suspected newcomer 106b analysis of items carried by the human object, and/or analysis of motion pattern of the human object may be carried out in addition to identification, whereas for other human objects 106a, 106c only identification is carried out.

The control component 308 may further control the video processing unit 402, 502 to prioritize the suspected newcomer 106b over the other human objects 106a, 106c when encoding video frames captured by the thermal camera 400 or the visual light camera 500. In more detail, when encoding a video frame, the video processing unit 402, 502 may compress different regions of the video frame with different compression levels. The compression level may be governed by a quantization parameter, QP, as for example known from the H.264 video coding standard. The video processing unit 402, 502 may be controlled to set the compression level depending on the priority level of the human objects 106a, 106b, 106c such that a higher priority level results in a lower compression level compared to a lower priority level. More specifically, for a region in the video frame corresponding to a suspected newcomer, such as the human object 106b, the compression level is set to be lower than for regions in the video frame corresponding to other human objects, such as human objects 106a, 106c. In this way, more bits are spent on encoding the human objects which are suspected newcomers, meaning that the human objects which are suspected newcomers will have a higher image quality than the other human objects in the resulting decoded video frame. It is to be understood that also other parameters besides the compression level may be set depending on the priority level. For example, a threshold for selecting to encode a block of pixels as a p-skip block may be changed such that the video processing unit 402, 502 becomes more prone to encode a block as a p-skip block in a region of a video frame which does not correspond to a suspected newcomer compared to a region corresponding to a suspected newcomer.

As part of the video content analytics, the video processing unit 402, 502 may be configured to trigger alarms as various abnormal situations occur. Such an abnormal situation may be that a person is identified who is not allowed to be in the first environment, for example, a person who is not on a list of persons maintained by the video processing unit 402, 502 for that purpose, that a person is carrying a suspected item, for example, a weapon or a bomb vest, or that a person has a deviating motion pattern. The control component 308 may be arranged to control the video processing unit 402, 502 to adjust the sensitivity for triggering alarms based on the priority of the depicted human objects 106a, 106b, 106c. In particular, the sensitivity for triggering an alarm may be increased for suspected newcomers, such as the human object 106b, in comparison to the other human objects 106a, 106c. In some cases, the sensitivity for triggering an alarm may be associated with a threshold. If the threshold is exceeded, an alarm is triggered. The value of the threshold may be dependent on the priority of the human objects 106a, 106b, 106c such that the video processing unit 402, 502 reduces the threshold for suspected newcomers, such as the human object 106b, in comparison to the other human objects 106a, 106c. In that way, the sensitivity for triggering an alarm is increased with respect to suspected newcomers.

On a more detailed level, the process of triggering of an alarm may be implemented as a statistical hypothesis test. A statistical hypothesis test includes comparing a test statistic formed on basis of observations to a threshold. The observations in this case correspond to an image of the human objects captured by the thermal camera 400 or by the visual light camera 500. The threshold of the test will be associated with a significance level. The significance level will in this setting correspond to the probability of triggering a false alarm. The video processing unit 402, 502 may be controlled to set the significance level on basis of the priority of the human objects 106a, 106b, 106c such that a higher significance level is set for suspected newcomers 106b, in other words, more false alarms are accepted for suspected intrudes, than for other objects 106a, 106c.

It will be appreciated that a person skilled in the art can modify the above-described embodiments in many ways and still use the advantages of the present teachings as shown in the embodiments above. For example, it is to be noted that there may be other reasons for raising the priority of a human object. For example, if an identification check done on a human object 106a, 106c other than the suspected newcomer 106b fails, the priority of that human object 106a, 106c may also be raised. The priority levels may thus be set based on a number of factors, of which the deviating thermal signature is one factor. The control of the video processing unit 402, 502 may then be based on the resulting priority levels after all factors have been taken into consideration. Thus, the present teachings should not be limited to the shown embodiments but should only be defined by the appended claims. Additionally, as the skilled person understands, the shown embodiments may be combined.

What is claimed is:

1. A method of controlling a video processing unit to facilitate detection of newcomers in a first environment comprising:

capturing a thermal image of a human object in the first environment, the first environment being associated with a first climate;

calculating, based on the thermal image, a thermal signature of a portion of the human object, wherein the thermal signature of the portion of the human object corresponds to a portion of the thermal image and reflects a spatial distribution of a surface temperature of the portion of the human object;

determining that the human object has entered the first environment from a second environment when the thermal signature of the portion of the human object deviates from a predetermined thermal signature associated with the first environment, wherein the second environment is associated with a second, different, climate, and wherein the predetermined thermal signature associated with the first environment corresponds to a thermal signature of a human object being in thermal equilibrium with the first climate of the first environment, wherein the predetermined thermal signature associated with the first environment reflects a spatial distribution of a surface temperature of a corresponding portion of the human object being in thermal equilibrium with the first climate of the first environment; and controlling the video processing unit to prioritize the human object over other human objects when processing video frames depicting the human object together with the other human objects.

2. The method of claim 1, wherein the video processing unit is controlled to prioritize the human object when performing video content analytics.

3. The method of claim 1, wherein the video processing unit is controlled to prioritize the human object when encoding video frames depicting the human object.

4. The method of claim 1, wherein the human object is associated with a priority level, and wherein the video processing unit is controlled to prioritize the human object by increasing its priority level in relation to priority levels of the other human objects.

5. The method of claim 4, wherein the video processing unit is controlled to analyze human objects in video frames in decreasing order of priority level.

6. The method of claim 5, wherein the video processing unit is controlled to reduce the priority level of the human object after it has been analyzed.

7. The method of claim 4, wherein the video processing unit is controlled to select complexity of an algorithm used to analyze a human object or a number of algorithms used to analyze a human object based on the priority level of the human object, such that the complexity or the number of algorithms increase with the priority level of the human object.

8. The method of claim 1, wherein the video processing unit is controlled to prioritize the human object by reducing a compression level in a region corresponding to the human object compared to regions corresponding to the other human objects when encoding video frames depicting the human object together with the other human objects.

9. The method of claim 1, wherein the human object is associated with a threshold for triggering an alarm, and wherein the video processing unit is controlled to reduce the threshold for triggering an alarm in relation to corresponding thresholds of the other human objects.

10. The method of claim 1, further comprising controlling the video processing unit to increase a frame rate when processing video frames if a human object which is determined to have entered the first environment from the second environment is depicted in the video frames, and to reduce a frame rate when processing video frames if no human object which has entered the first environment from the second environment is currently depicted in the video frames.

11. The method of claim 1, wherein the thermal signature of the portion of the human object reflects a distribution of intensity values of the thermal image in a region corresponding to the portion of the human object.

12. The method of claim 1, wherein the thermal signature is calculated as a region of the thermal image that corresponds to the portion of the human object, and wherein the determining comprises:

providing the region of the thermal image that corresponds to the portion of the human object to a machine learning algorithm, wherein the machine learning algorithm has been trained to distinguish between thermal images of human objects which are present in the first environment but which are not in thermal equilibrium with the first climate of the first environment, and thermal images of human objects which are present in the first environment and which are in thermal equilibrium with the first climate of the first environment.

13. The method of claim 1, wherein the thermal image is captured by a thermal camera, and wherein the video processing unit is controlled to prioritize the human object when processing video frames captured by the thermal camera or when processing video frames captured by a visual light camera depicting the same human object.

14. A controller for controlling a video processing unit to facilitate detection of newcomers in a first environment, the controller comprising:

a receiver configured to receive a thermal image of a human object in the first environment, the first environment being associated with a first climate;

circuitry configured to calculate, based on the thermal image, a thermal signature of a portion of the human object, wherein the thermal signature of the portion of the human object corresponds to a portion of the thermal image and reflects a spatial distribution of a surface temperature of the portion of the human object;

circuitry configured to determine that the human object has entered the first environment from a second environment when the thermal signature of the portion of the human object deviates from a predetermined thermal signature associated with the first environment, wherein the second environment is associated with a second, different, climate, and wherein the predetermined thermal signature associated with the first environment of a human object being in thermal equilibrium with the first climate of the first environment, wherein the predetermined thermal signature associated with the first environment reflects a spatial distribution of a surface temperature of a corresponding portion of the human object being in thermal equilibrium with the first climate of the first environment; and circuitry configured to control the video processing unit to prioritize the human object over other human objects when processing video frames depicting the human object together with the other human objects.

15. A non-transitory computer-readable storage medium having instructions stored thereon which, when executed by a device having a processing capability, cause the device to perform operations for controlling a video processing unit to facilitate detection of newcomers in a first environment, the operations comprising:

capturing a thermal image of a human object in the first environment, the first environment being associated with a first climate;

calculating, based on the thermal image, a thermal signature of a portion of the human object, wherein the thermal signature of the portion of the human object corresponds to a portion of the thermal image and reflects a spatial distribution of a surface temperature of the portion of the human object;

determining that the human object has entered the first environment from a second environment when the thermal signature of the portion of the human object deviates from a predetermined thermal signature associated with the first environment, wherein the second environment is associated with a second, different, climate, and wherein the predetermined thermal signature associated with the first environment a human object being in thermal equilibrium with the first climate of the first environment, wherein the predetermined thermal signature associated with the first environment reflects a spatial distribution of a surface temperature of a corresponding portion of the human object being in thermal equilibrium with the first climate of the first environment; and controlling the video processing unit to prioritize the human object over other human objects when processing video frames depicting the human object together with the other human objects.

* * * * *